United States Patent
Corsner et al.

(10) Patent No.: US 7,597,963 B2
(45) Date of Patent: Oct. 6, 2009

(54) INSULATING GLASS (IG) WINDOW UNIT INCLUDING HEAT TREATABLE COATING WITH SPECIFIC COLOR CHARACTERISTICS AND LOW SHEET RESISTANCE

(75) Inventors: Bryce Corsner, Seneca Falls, NY (US); Nancy Bassett, Macedon, NY (US); Anton Dietrich, Fontnas (CH); Jose Nunez-Regueiro, Fairport, NY (US)

(73) Assignees: Guardian Industries Corp., Auburn Hills, MI (US); Centre Luxembourgeois de Recherches pour le Verre et la Ceramique S.A. (C.R.V.C.), Luxembourg (LU)

( * ) Notice: Subject to any disclaimer, the term of this patent is extended or adjusted under 35 U.S.C. 154(b) by 204 days.

(21) Appl. No.: 11/176,678

(22) Filed: Jul. 8, 2005

(65) Prior Publication Data
US 2007/0009746 A1    Jan. 11, 2007

(51) Int. Cl.
*B32B 17/06*    (2006.01)
(52) U.S. Cl. ................ 428/432; 428/426; 428/428; 428/434; 428/446; 428/448; 428/697; 428/698; 428/701; 428/702; 428/699; 428/704
(58) Field of Classification Search .......... 428/34, 428/428, 432, 446, 448, 701, 702, 704
See application file for complete search history.

(56) References Cited

U.S. PATENT DOCUMENTS

| | | | |
|---|---|---|---|
| 4,799,745 A | 1/1989 | Meyer et al. | |
| 4,965,121 A | 10/1990 | Young et al. | |
| 5,332,888 A | 7/1994 | Tausch et al. | |
| 5,344,718 A | 9/1994 | Hartig et al. | |
| 5,376,455 A | 12/1994 | Hartig et al. | |
| 5,514,476 A | 5/1996 | Hartig et al. | |
| 5,521,765 A | 5/1996 | Wolfe | |
| 5,557,462 A | 9/1996 | Hartig et al. | |
| 5,563,734 A | 10/1996 | Wolfe et al. | |
| 5,584,902 A | 12/1996 | Hartig et al. | |
| 5,800,933 A | 9/1998 | Hartig et al. | |
| 5,837,108 A | 11/1998 | Lingle et al. | |
| 6,014,872 A | 1/2000 | Hartig et al. | |
| 6,059,909 A | 5/2000 | Hartig et al. | |
| 6,492,619 B1 | 12/2002 | Sol | |
| 6,514,620 B1 | 2/2003 | Lingle et al. | |
| 6,524,688 B1 | 2/2003 | Eby et al. | |
| 6,576,349 B2 | 6/2003 | Lingle et al. | |
| 6,586,102 B1 | 7/2003 | Stachowiak | |
| 6,589,658 B1 * | 7/2003 | Stachowiak ............ 428/432 |
| 6,605,358 B1 | 8/2003 | Stachowiak | |
| 6,625,875 B2 | 9/2003 | Sol | |

(Continued)

FOREIGN PATENT DOCUMENTS

WO    WO 02/04375    1/2002

*Primary Examiner*—Ling Xu
(74) *Attorney, Agent, or Firm*—Nixon & Vanderhye P.C.

(57) ABSTRACT

An insulating glass (IG) window unit, or other suitable window unit, includes a glass substrate with a coating thereon. The coating includes a lower contact layer based on zinc oxide and/or at least one silicon nitride inclusive layer that is Si-rich (i.e., non-stoichiometric). Using such a design, it has been found that coloration can be adjusted in order to achieve certain desirable optical characteristics.

13 Claims, 2 Drawing Sheets

U.S. PATENT DOCUMENTS

| | | | |
|---|---|---|---|
| 6,632,491 B1 * | 10/2003 | Thomsen et al. | 428/34 |
| 6,749,941 B2 | 6/2004 | Lingle | |
| 6,974,630 B1 * | 12/2005 | Stachowiak | 428/432 |
| 2003/0049464 A1 | 3/2003 | Glenn et al. | |
| 2003/0150711 A1 | 8/2003 | Laird | |
| 2003/0194570 A1 | 10/2003 | Lingle et al. | |
| 2004/0005467 A1 * | 1/2004 | Neuman et al. | 428/432 |
| 2004/0043226 A1 * | 3/2004 | Laird et al. | 428/432 |
| 2004/0224167 A1 * | 11/2004 | Stachowiak | 428/432 |
| 2004/0229073 A1 * | 11/2004 | Dietrich et al. | 428/627 |
| 2004/0229074 A1 * | 11/2004 | Lingle et al. | 428/627 |
| 2005/0025917 A1 * | 2/2005 | Laird et al. | 428/34 |

* cited by examiner

INSULATING GLASS (IG) WINDOW UNIT INCLUDING HEAT TREATABLE COATING WITH SPECIFIC COLOR CHARACTERISTICS AND LOW SHEET RESISTANCE

Certain embodiments of this invention relate to an insulating glass (IG) window unit including a heat treatable coating having particularly tailored color characteristics and low sheet resistance. Optionally, a silicon (Si) rich silicon nitride inclusive layer may also be provided in order to achieve desired optical characteristics in the window unit. The coated article may be heat treated (HT) (e.g., thermally tempered) in certain example embodiments.

BACKGROUND AND SUMMARY OF EXAMPLE EMBODIMENTS OF THE INVENTION

Coated articles and IG window units are known in the art. For example, see U.S. Pat. Nos. 5,514,476, 5,800,933 and 6,014,872.

Commonly owned U.S. Patent Application Publication No. 2003/0150711 (hereby incorporated herein by reference) discloses a coated article as follows, from the glass substrate outwardly (the top tin oxide layer may be omitted in certain instances) with example thicknesses listed in units of angstroms (Å):

TABLE 1

Example Coating of 2003/0150711

| Layer Glass Substrate | Preferred Range (Å) | More Preferred (Å) | Example (Å) |
|---|---|---|---|
| $TiO_2$ | 0-700 Å | 100-400 Å | 200 Å |
| $ZnO_x$ | 25-200 Å | 40-150 Å | 90 Å |
| Ag | 50-250 Å | 80-200 Å | 130 Å |
| $NiCrO_x$ | 5-100 Å | 15-60 Å | 30 Å |
| $SnO_2$ | 0-1,000 Å | 500-900 Å | 680 Å |
| $ZnO_x$ | 25-200 Å | 40-150 Å | 90 Å |
| Ag | 50-250 Å | 80-220 Å | 168 Å |
| $NiCrO_x$ | 5-100 Å | 15-60 Å | 30 Å |
| $SnO_2$ | 0-500 Å | 70-200 Å | 125 Å |
| $Si_3N_4$ | 0-500 Å | 120-320 Å | 220 Å |

When the aforesaid coated article is coupled with another glass substrate in order to make an IG window unit, the resulting IG window unit (not heat treated (HT)) generally has the following optical characteristics (Ill. C, 2 degree observer):

TABLE 2

Optical Characteristics of IG Window Units with Above Coating (non-HT)

| Characteristic | General | More Preferred |
|---|---|---|
| $T_{vis}$ (or TY) (transmissive): | >=69% | >=70% |
| $a^*_t$: | −6.0 to +1.0 | −5.0 to −2.0 |
| $b^*_t$: | −1.0 to 4.0 | 0.5 to 3.5 |
| $R_gY$ (glass side): | 5 to 15% | 8 to 12% |
| $a^*_g$: | −4.0 to +2.0 | −3.0 to −1.0 |
| $b^*_g$: | −4.0 to +2.0 | −3.0 to +1.5 |
| $L^*_g$: | 34 to 42 | 36 to 40 |
| $R_fY$ (film side): | 5 to 18% | 9 to 15% |
| $a^*_f$: | −5.0 to +4.0 | −3.0 to +2.0 |
| $b^*_f$: | −8.0 to +8.0 | −5.0 to +6.0 |
| $L^*_f$: | 33 to 48 | 35 to 45 |

In Table 2 above, $T_{vis}$ stands for visible light transmission, and $a^*_t$ and $b^*_t$ stand for transmissive (t) a* and b* color values, respectively. Glass side (g) and film side (f) values are presented in a similar manner. It is noted that the color values herein (e.g., a*, b*, L*) are calculated in accordance with the CIE LAB 1976 L*, a*, b* coordinate technique.

The IG units of Tables 1-2 (and thus 2003/0150711) are not heat treated (HT). However, in commercial applications, at least some IG units often are required to be heat treated (e.g., tempered) for safety purposes. In office buildings for example, it is often desirable that some windows be heat treated while others need not be. Thus, a need for matchability (before heat treatment vs. after heat treatment) arises. In other words, it is desirable that window units which are heat treated (HT) substantially or approximately match their non-heat treated counterparts (e.g., with regard to color, visible transmission, reflectance, and/or the like), at least with respect to transmissive and glass side reflective optical characteristics, for architectural and/or aesthetic purposes.

Unfortunately, coatings of 2003/0150711 cannot withstand HT without significant color and/or durability change. Thus, coatings of 2003/0150711 cannot be HT and then used commercially to achieve matchability with their non-HT counterparts.

It will be apparent from the above that there exists a need in the art for coatings that, upon HT, approximately matches non-HT coatings of 2003/0150711 in the context of IG window units with regard to visible transmission, visible reflectance, transmissive color, and/or glass side reflective color.

While coatings having multiple infrared (IR) reflecting Ag layers are desirable in certain instances, they tend to have very low sheet resistance ($R_s$) values thereby making them difficult to easily HT (without resulting in damage or becoming prohibitively costly) using inexpensive HT processing/machinery. This is because the dual Ag layers tend to reflect much of the energy in the furnace intended for tempering the underlying glass substrate. Single silver coatings, with higher sheet resistances, are easier to HT in this regard. Thus, in certain example non-limiting instances it would be desirable for coatings herein to achieve the aforesaid matchability and/or be of the single Ag layer type (or have higher $R_s$) so that they can be more easily heat treated using conventional low-tech radiant tempering furnaces.

U.S. Pat. Nos. 5,514,476 and 5,800,933 discloses coated articles including: glass substrate/$Si_3N_4$/NiCr/Ag/NiCr/$Si_3N_4$. Unfortunately, upon HT and use in an IG unit, the resulting IG units do not approximately match the general aforesaid optical characteristics of IG units set forth in Table 2.

WO 02/04375 discloses a dual-silver low-E coating have good color characteristics after HT and lamination. Unfortunately, the coatings of WO 02/04375 require multiple silver (Ag) layers and have very low sheet resistance ($R_s$) (e.g., about 4-5 ohms/square) before HT. This makes the coatings of WO 02/04375 difficult to HT using conventional low-tech radiant tempering furnaces since the dual Ag layers reflect much of the energy intended for tempering the underlying glass substrate. It is noted that WO 02/04375 is a counterpart to U.S. Ser. No. 09/794,224, filed Feb. 28, 2001.

U.S. Pat. No. 6,749,941 (incorporated herein by reference) discloses a coated article made up of the following stack: glass/SiN/NiCr/Ag/NiCr/SiN. This coated article is designed to approximately match that of 2003/0150711 with respect to optical characteristics after being heat treated. However, it would be desirable if the solar performance (e.g., SHGC, sheet resistance and/or emissivity), ultraviolet (UV) transmission, and/or thermal stability of the coated article of the '941 patent could be improved without sacrificing the coated article's ability to approximately match that of 2003/0150711 with respect to color and transmission characteristics following heat treatment.

An object of certain example non-limiting embodiments of this invention is to provide a coating that, upon HT and in the context of IG window units, approximately matches an IG unit including a non-HT coating of 2003/0150711 (see general desired optical characteristics in Table 2 above) with respect to visible transmission ($T_{vis}$), visible glass side reflectance ($R_gY$), transmissive color (a* and/or b*), and/or glass side reflective color (a* and/or b*).

Another object of certain example non-limiting embodiments of this invention is to provide a single silver (Ag) coating (i.e., including only one Ag layer) that, upon HT and in the context of IG window units, approximately matches an IG unit including a non-HT coating of 2003/0150711 with respect to visible transmission ($T_{vis}$), visible glass side reflectance ($R_gY$), transmissive color (a* and/or b*), and/or glass side reflective color (a* and/or b*).

In certain example embodiments of this invention, it would be desirable for the coating, before and/or after HT, to have a sheet resistance ($R_s$) of no more than about 10 ohms/square, more preferably no more than about 8 ohms/square, even more preferably no more than about 6 ohms/square, and most preferably no more than about 5 ohms/square. In certain example embodiments, the coating has only one Ag layer.

It has surprisingly been found that the use of a coating including a stack: glass/SiN/ZnO/Ag/NiCr/SiN can be tailored to result in a coated article that can achieve remarkably lower sheet resistance, remarkably lower UV transmission characteristics, and improved thermal stability upon HT compared to coatings of U.S. Pat. No. 6,749,941, while still being able to approximately match after HT coated articles of U.S. Patent Publication No. 2003/0150711 with respect to visible transmission ($T_{vis}$), visible glass side reflectance ($R_gY$), transmissive color (a* and/or b*), and/or glass side reflective color (a* and/or b*).

In certain example embodiments, it is optionally possible to use a layer of Si-rich (non-stoichiometric) silicon nitride as the bottom silicon nitride inclusive layer in order to help achieve certain desired color characteristics (whether corresponding to non-HT coatings of 2003/0150711 or not). In certain example non-limiting embodiments, it is possible to provide a heat treatable coating that includes a non-stoichiometric silicon nitride layer, wherein the amount of Si in the layer is adjusted (i.e., increased relative to stoichiometric $Si_3N_4$) so as to increase the layer's index of refraction "n" and/or extinction coefficient "k", in order to achieve desired optical characteristics.

In certain example embodiments of this invention there is provided a insulating glass (IG) window unit comprising: first and second glass substrates spaced apart from one another so that a space is provided therebetween, at least the first glass substrate being thermally tempered and supporting a coating, wherein the coating comprises: a first dielectric layer comprising silicon nitride, a lower contact layer comprising zinc oxide, a layer comprising Ag, an upper contact layer, wherein the layer comprising Ag is located between and directly contacts each of said upper and lower contact layers, and a second dielectric layer, wherein the IG window unit has a SHGC of no greater 0.55, a visible transmission of at least about 68%, transmissive a* color of from −5.5 to 0.0, transmissive b* color of from +0.5 to +3.5, glass side reflective a* color of from −4.0 to +2.0, and glass side reflective b* color of from −4.0 to +3.0.

In certain other example embodiments of this invention, there is provided a insulating glass (IG) window unit comprising: first and second glass substrates spaced apart from one another so that a space is provided therebetween, at least the first glass substrate supporting a coating and being thermally tempered, wherein the coating comprises: a first dielectric layer, a lower contact layer comprising zinc oxide, a layer comprising Ag, an upper contact layer, wherein the layer comprising Ag is located between and directly contacts each of said upper and lower contact layers, and a second dielectric layer, wherein the IG window unit has a SHGC of no greater 0.55, glass side reflective a* color of from −3.0 to +1.0, glass side reflective b* color of from −3.0 to +1.5.

DETAILED DESCRIPTION OF CERTAIN EXAMPLE EMBODIMENTS OF THE INVENTION

Certain embodiments of this invention relate to a coated article including a coating supported by a substrate. The coating may be provided either directly on and in contact with the underlying substrate, or alternatively may be provided on the substrate with other layer(s) therebetween.

Unexpectedly, it has been found that the use of a coating including a stack comprising: glass/SiN/ZnO/Ag/NiCr/SiN can be tailored to result in a coated article that can achieve remarkably lower sheet resistance, remarkably lower UV transmission characteristics, and improved thermal stability upon HT compared to coatings of U.S. Pat. No. 6,749,941, while still being able to approximately match after HT coated articles of U.S. Patent Publication No. 2003/0150711 with respect to visible transmission ($T_{vis}$), visible glass side reflectance ($R_gY$), transmissive color (a* and/or b*), and/or glass side reflective color (a* and/or b*). The silicon nitride and/or zinc oxide layers may be doped with a material(s) such as aluminum in certain example instances.

Optionally, in certain example embodiments, the coating may include at least one layer comprising silicon nitride that is silicon (Si) rich. By making the layer Si-rich, the index of refraction "n" and/or extinction coefficient "k" of the layer can be increased in amount(s) sufficient to achieve desired color (transmissive and/or glass side reflective) and/or other optical characteristics of the coating when used in a window unit (e.g., IG window unit, or any other suitable type of window unit). In certain example embodiments, the layer comprising silicon nitride may be Si-rich to an extent sufficient so that a resulting IG window unit including the heat-treated (HT) coating approximately matches an IG unit including a non-HT coating of 2003/0150711 (see general desired optical characteristics in Table 2 above) with respect to visible transmission ($T_{vis}$), visible glass side reflectance ($R_gY$), transmissive color (a* and/or b*), and/or glass side reflective color (a* and/or b*).

Figure 1:
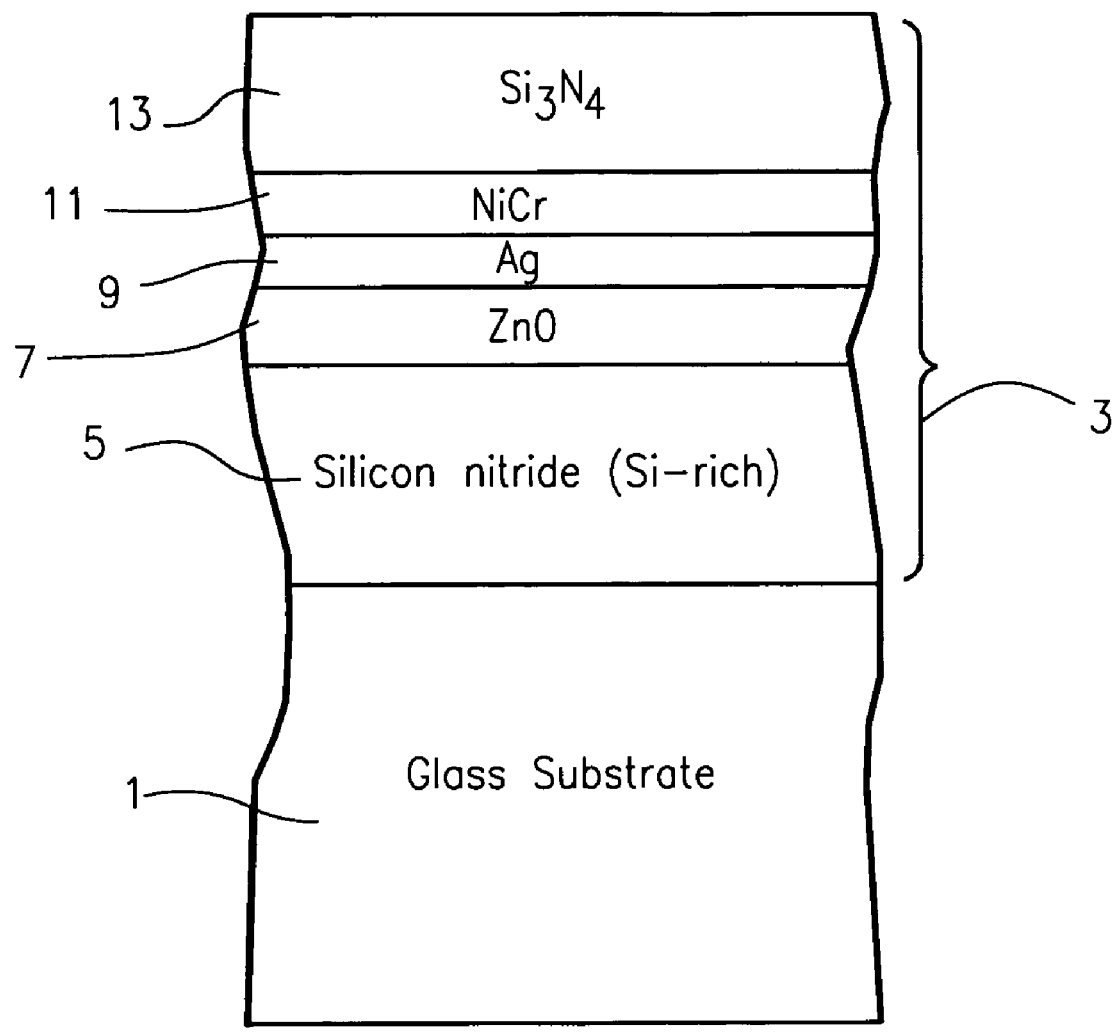
FIG. 1 is a cross sectional view of a coating on a substrate according to an example embodiment of this invention.

FIG. 1 illustrates a coating 3 according to an example embodiment of this invention, supported by glass substrate 1. Substrate 1 is preferably glass such as soda-lime-silica glass, borosilicate glass, or the like. As for glass color, substrate 1 may be clear, green, bronze, blue-green, grey, or any other suitable color in different embodiments of this invention, and is preferably from about 1.0 to 10.0 mm thick, more preferably from about 1.0 mm to 3.5 mm thick.

The coating 3 shown in FIG. 1 includes, from the glass substrate 1 outwardly, silicon nitride inclusive layer 5, bottom contact layer 7 of or including zinc oxide, infrared (IR) reflecting layer 9, top contact layer 11, and top dielectric layer 13. The "contact" layers 7 and 11 each contact IR reflecting layer 9. Infrared (IR) reflecting layer 9 is preferably metallic and conductive, and may be made of or include silver (Ag), gold, alloys thereof, or any other suitable IR reflecting material. However, metallic Ag is the material of choice for the IR reflecting layer 9 in certain example non-limiting embodiments of this invention. The IR reflecting layer enables coating 3 to have good solar control characteristics.

Bottom contact layer 7 may be of or include zinc oxide (e.g., ZnO) in certain example embodiments of this invention. The zinc oxide may be doped with Al or the like in certain example instances to provided desired conductivity for sputtering. In certain example embodiments, the zinc oxide of layer 7 may include from about 0.5 to 10% Al, more preferably from about 1 to 3% Al. As explained above, the use of zinc oxide in bottom contact layer 7 is an important aspect of this invention. In particular, it has been found that the use of zinc oxide in bottom contact layer 7 permits a coated article to be provided that can achieve remarkably lower sheet resistance, remarkably lower UV transmission characteristics, and improved thermal stability upon HT compared to coatings of U.S. Pat. No. 6,749,941, while still being able to approximately match after HT coated articles of U.S. Patent Publication No. 2003/0150711 with respect to visible transmission ($T_{vis}$) visible glass side reflectance ($R_gY$), transmissive color (a* and/or b*), and/or glass side reflective color (a* and/or b*). The use if zinc oxide in bottom contact layer 7 is also advantageous in that it is generally non-absorbing and provides a good base for the silver. Thus, it allows for a thicker silver based layer 9 to be deposited without suffering a significant adverse effect with respect to visible transmission performance.

Upper contact layer 11 may be of or include nickel (Ni), chromium (Cr), or an alloy of nickel-chrome (NiCr) in different embodiments of this invention. Alternatively, upper contact layer 11 may comprise or consist essentially of nickel oxide, chromium/chrome oxide, a nickel alloy oxide such as nickel chrome oxide ($NiCrO_x$), a nickel alloy nitride such as nickel chrome nitride ($NiCrN_x$), or a nickel alloy oxynitride such as nickel chrome oxynitride ($NiCrO_xN_y$) in other example embodiments of this invention. When upper contact layer 11 comprises NiCr or $NiCrN_x$ in certain embodiments, the Ni and Cr may be provided in different amounts, such as in the form of nichrome by weight about 80-90% Ni and 10-20% Cr. In other embodiments, sputtering target(s) used in sputtering layer 11 may be 50/50 Ni/Cr, 60/40 Ni/Cr, 70/30 Ni/Cr, or any other suitable weight ratio. An exemplary sputtering target for depositing layer 11 includes not only SS-316 which consists essentially of 10% Ni and 90% other ingredients, mainly Fe and Cr, but potentially Haynes 214 alloy as well (e.g., see U.S. Pat. No. 5,688,585). Optionally, upper contact layer 11 may be oxidation and/or nitrogen graded in different embodiments of this invention so as to be more metallic closer to the IR reflecting layer and less metallic further from the IR reflecting layer 9. Upper contact layer 11 may or may not be continuous in different embodiments of this invention, depending upon its thickness.

Top dielectric layer 13 may comprise silicon nitride (e.g., stoichiometric $Si_3N_4$ or any other suitable non-stoichiometric form of silicon nitride) in certain example embodiments of this invention. In other embodiments, dielectric layer 13 may include silicon oxynitride, silicon oxide, or any other suitable dielectric material. Optionally, other layers may be provide on substrate 1 over dielectric layer 13 in certain embodiments of this invention.

In certain embodiments of this invention, dielectric layer 5 may be of silicon nitride or the like. In certain example non-limiting instances, the silicon nitride of layer 5 may be stoichiometric (i.e., $Si_3N_4$). However, in alternative example embodiments of this invention, dielectric layer 5 may be of or include a silicon-rich (Si-rich) form of silicon nitride (i.e., $Si_xN_y$ where x/y may be from about 0.76 to 2.0, more preferably from about 0.80 to 1.5, and most preferably from about 0.80 to 1.3). Surprisingly, it has been found that by making silicon nitride layer 5 non-stoichiometric and Si-rich in certain instances, it is easier for a coating upon heat treatment (HT) and assembly into an IG window unit to approximately match an IG unit including a non-HT coating of 2003/0150711 (see general desired optical characteristics in Table 2 above) with respect to visible transmission ($T_{vis}$), visible glass side reflectance ($R_gY$), transmissive color (a* and/or b*), and/or glass side reflective color (a* and/or b*). It is noted that the layer 5 comprising silicon nitride may or may not be partially oxidized in certain embodiments of this invention and may be doped with Al, stainless steel, or the like in certain example instances. Making the silicon nitride layer 5 non-stoichiometric by increasing its Si content causes the layer's index of refraction "n" and extinction coefficient "k" to increase (e.g., in the range of 350-550 nm). In particular, in certain example embodiments of this invention, increasing the Si content in silicon nitride layer 5 (i.e., making it Si-rich) causes the layer to have an index of refraction "n" (at 550 nm) of from 2.15 to 2.6, more preferably from 2.2 to 2.5, and most preferably from 2.35 to 2.45 (compare to an index of refraction "n" of 2.05 for stoichiometric $Si_3N_4$). Making layer 5 Si-rich causes both "n" and "k" to rise; however care is to be taken to make sure that "k" does not rise too much. In particular, if "k" becomes too high (e.g., greater than 0.07), an undesirable brown color can be realized in certain instances. Thus, it is sometimes desirable not to make the silicon nitride layer 5 too Si-rich. In certain embodiments of this invention, the Si content in the silicon nitride layer 5 is raised (to make it non-stoichiometric) to an extent such that the layer's extinction coefficient "k" (at 550 nm) is from 0 to 0.07, more preferably from 0 to 0.06, even more preferably from 0 to 0.05, and most preferably from 0.0001 to 0.05.

In certain example embodiments of this invention, coating 3 may include at least the below listed layers, from the glass substrate outwardly (example thicknesses listed in units of Å):

TABLE 3

Example Coatings 3

| Layer<br>Glass Substrate | Preferred<br>Range (Å) | More<br>Preferred (Å) | Example (Å) |
|---|---|---|---|
| silicon nitride (5): | 50-900 Å | 250-600 Å | 320 Å |
| $ZnAlO_x$ (7) | 40-300 Å | 50-200 Å | 100 Å |
| Ag (9) | 75-250 Å | 120-175 Å | 150 Å |
| NiCr (11) | 4-50 Å | 4-25 Å | 14 Å |
| $Si_3N_4$ (13) | 50-900 Å | 300-550 Å | 433 Å |

Figure 2:
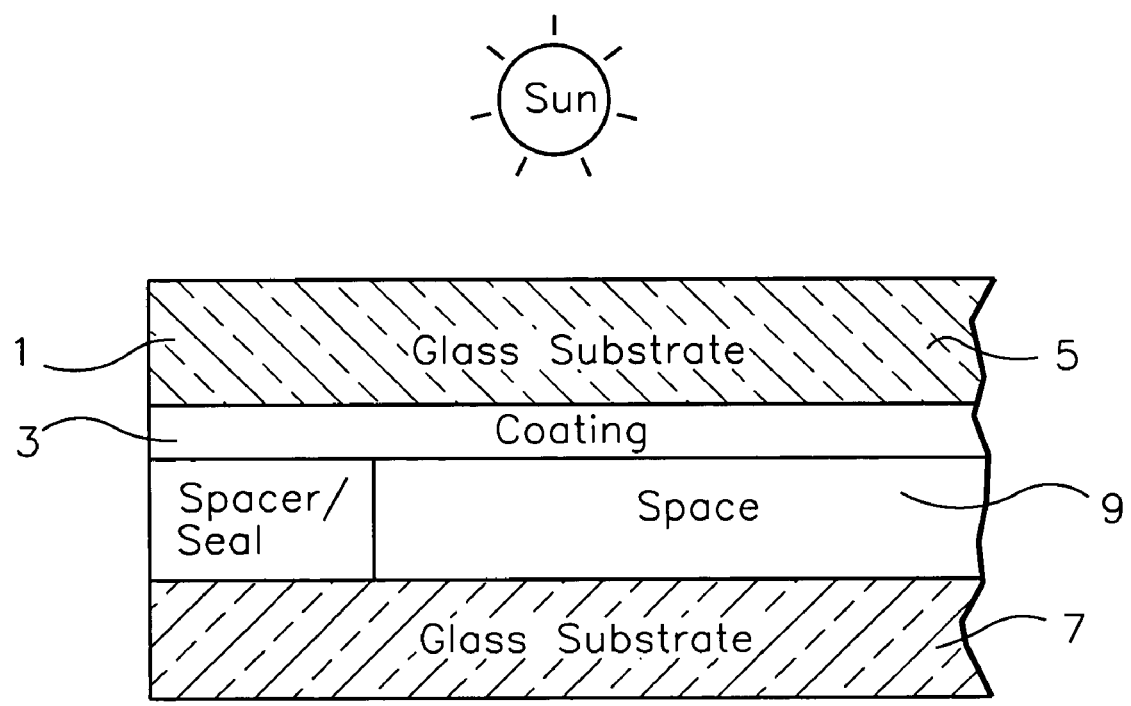
FIG. 2 is a cross sectional view of an insulating glass (IG) window unit including the coating of FIG. 1 according to an example embodiment of this invention.

FIG. 2 illustrates part of an IG window unit including the coating 3 of FIG. 1. As shown in FIG. 2, the coated substrate 1 is preferably coupled (after HT in certain instances) to another substrate (glass or plastic) via at least one spacer and/or seal so as to form an IG window unit. The space or gap between the opposing substrates may or may not be evacuated to a pressure below atmospheric in different embodiments of this invention. Moreover, the space or gap between the substrates may or may not be filled with a gas (e.g., Ar) in different embodiments of this invention. Referring to FIG. 2, those skilled in the art will recognize that glass side reflective color (e.g., $a^*_g$ and $b^*_g$) means reflective color as viewed from the same side of the IG unit as where the sun is located in FIG. 2 (film side reflective color is reflective color as viewed from the other side of the IG unit—i.e., from the interior of the building).

Coated articles according to certain example embodiments of this invention are often heat treated (e.g., thermally tempered). Because of the coating design, certain example embodiments of this invention are able to achieve the following optical characteristics after HT (such HT often necessitates heating the coated substrate to temperatures of from 500° C. to 800° C. (more preferably from about 580 to 750 degrees C.) for a sufficient period of time, e.g., 1 to 15 minutes, to attain the desired result, e.g., thermal tempering, bending, and/or heat strengthening) and after assembly into an IG unit, which approximately match an IG unit having a non-HT coating of Table 1 above. Optical characteristics herein are measured, for clear glass, with regard to Ill. C, 2 degree observer. The sheet resistance is before and/or after HT.

TABLE 4

Example Characteristics of IG Window Units (HT)

| Characteristic | General | More Preferred | Most Preferred |
|---|---|---|---|
| $T_{vis}$ (or TY) (transmissive): | >=67% | >=68% | 68-72% |
| $a^*_t$: | −6.0 to +1.0 | −5.5 to 0 | −5 to −2 |
| $b^*_t$: | −1.0 to 4.0 | 0.5 to 3.5 | +.5 to +2.5 |
| $L^*_t$: | 80 to 90 | 84 to 90 | 85 to 89 |
| $R_gY$ (glass side): | 5 to 15% | 8 to 12% | 9 to 11% |
| $a^*_g$: | −4.0 to +2.0 | −3.0 to +1.0 | −2.0 to −0.5 |
| $b^*_g$: | −4.0 to +3.0 | −3.0 to +1.5 | −3.0 to −0.5 |
| $L^*_g$: | 34 to 42 | 36 to 40 | 36 to 40 |
| $R_fY$ (film side): | 6 to 18% | 9 to 16% | 11.0 to 14.0% |
| $a^*_f$: | −5.0 to +4.0 | −2.0 to +3.0 | −4.0 to −1 |
| $b^*_f$: | −8.0 to +8.0 | −3.0 to +2.0 | +1.0 to +3.5 |
| $L^*_f$: | 38 to 48 | 40 to 46 | 41.0 to 44.5 |
| Sheet Resistance (ohms/sq.): | <=10 | <=8 | <=5 or 6 |
| T(ultraviolet) | <=0.3 | <=0.29 | <=0.27 |
| SHGC | <=0.58 | <=0.55 | <=0.52 or .48 |

It can be seen from the above that the optical characteristics of certain embodiments of this invention approximately match those of Table 2 above, even though the two coatings are entirely different (for a coating comparison, compare Tables 1 and 3 above). In certain example embodiments of this invention, it is possible for an IG unit to realize an SHGC of no more than about 0.46.

EXAMPLES

The following actual Examples 1-4 and the Comparative Example (CE) were made and tested. These Examples had the following layers stacks, from the glass substrate moving outwardly (thicknesses in units of angstroms are in parenthesis following the material):

| Examples 1-4 Glass | Comparative Example (CE) Glass |
|---|---|
| SiN (320 Å) | SiN (427 Å) |
| ZnAlO (100 Å) | NiCr (14 Å) |
| Ag (varied) | Ag (100 Å) |
| NiCr (14 Å) | NiCr (14 Å) |
| SiN (433 Å) | SiN (433 Å) |

The only differences between Examples 1-4 and the CE were (a) the use of zinc oxide instead of NiCr in the bottom contact layer 7, (b) the thickness of the silver IR reflecting layer 9, and (c) the thickness of the bottom silicon nitride layer. Otherwise, Examples 1-4 and the CE were the same with respect to how the layers were deposited, materials, and so forth. The thickness of the silver based IR reflecting layer 9 varied in Examples 1-4 as follows: Example 1: 100 Å; Example 2: 125 Å; Example 3: 150 Å; and Example 4: 175 Å. These examples were formed by sputter-depositing the layer stack on a clear glass substrate, where SiAl rotatable magnetron targets were used to sputter-deposit the silicon nitride layers, NiCr target was used to sputter-deposit the upper contact layer, a rotatable magnetron ZnAl target was used to sputter-deposit the bottom zinc oxide contact layer, and a pair of planar Ag targets were used to sputter-deposit the silver IR reflecting layer.

Following heat treatment and provision in an IG unit, the Examples and CE had similar color characteristics (a*, b*) within the desired ranges set forth above. However, there were surprising advantages of Examples 1-4 compared to the CE as set forth in the Table below.

TABLE 5

Comparison of Examples 1-4 vs. Comparative Example (IG Unit - HT)

| | $T_{VIS}$ (%) | $R_s$ (ohms/sq) | SHGC | $T_{UV}$ |
|---|---|---|---|---|
| CE | 68 | 10.1 | 0.60 | 0.32 |
| Ex. 1 | 71.09 | 10.4 | 0.55 | 0.29 |
| Ex. 2 | 72.08 | 6.4 | 0.51 | 0.27 |
| Ex. 3 | 71.85 | 4.5 | 0.49 | 0.26 |
| Ex. 4 | 70.34 | 3.2 | 0.45 | 0.23 |

By comparing Examples 1-4 above to the Comparative Example (CE), it can be seen that replacing the NiCr bottom contact layer of the CE with a zinc oxide based layer surprisingly results in improved SHGC (i.e., lower SHGC) of the IG unit, and improved ultraviolet transmission characteristics (i.e., lower $T_{UV}$) of the IG unit. Moreover, it is also surprising that lower sheet resistance can also be achieved. It is also surprising that each of these advantages can be achieved without sacrificing the desired substantial matching after HT to optical properties of coated articles of U.S. Patent Publication No. 2003/0150711 with respect to visible transmission ($T_{vis}$), visible glass side reflectance ($R_gY$), transmissive color (a* and/or b*), and/or glass side reflective color (a* and/or b*).

Terms used herein are known in the art. For example, intensity of reflected visible wavelength light, i.e. "reflectance" is defined by its percentage and is reported as $R_xY$ or $R_x$ (i.e. the Y value cited below in ASTM E-308-85), wherein "X" is either "G" for glass side or "F" for film side. Herein, RY means glass side reflective reflectance and FY means film side reflectance. "Glass side" (e.g. "G") means, as viewed from the side of the glass substrate opposite that on which the coating resides, while "film side" (i.e. "F") means, as viewed from the side of the glass substrate on which the coating resides.

Color characteristics are measured and reported herein using the CIE LAB a*, b* coordinates and scale (i.e. the CIE a*b* diagram, Ill. CIE-C, 2 degree observer). Other similar coordinates may be equivalently used such as by the subscript "h" to signify the conventional use of the Hunter Lab Scale, or Ill. CIE-C, 10° observer, or the CIE LUV u*v* coordinates. These scales are defined herein according to ASTM D-2244-93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by 10 Using the CIE System" and/or as reported in IES LIGHTING HANDBOOK 1981 Reference Volume.

The term "shading coefficient" (SC) is a term well understood in the art and is used herein according to its well known meaning. It is determined according to ASHRAE Standard 142 "Standard Method for Determining and Expressing the Heat Transfer and Total Optical Properties of Fenestration Products" by ASHRAE Standards Project Committee, SPC 142, September 1995. SC may be obtained by dividing solar heat gain coefficient (SHGC) by about 0.87. Thus, the following formula may be used: SC=SHGC/0.87.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, other layers may be provided, such as between the illustrated coating and the glass substrate, or alternatively over the illustrated coating.

The invention claimed is:

1. An insulating glass (IG) window unit comprising:
first and second glass substrates spaced apart from one another so that a space is provided therebetween, at least the first glass substrate being thermally tempered and supporting a coating, wherein the coating consists essentially of:
a first dielectric layer comprising silicon nitride,
a lower contact layer comprising zinc oxide over and contacting the first dielectric layer comprising silicon nitride,
a layer comprising Ag over and contacting the lower contact layer comprising zinc oxide,
an upper contact layer comprising Ni and/or Cr, wherein the layer comprising Ag is located between and directly contacts each of said upper and lower contact layers, and
a second dielectric layer comprising silicon nitride located over and contacting the upper contact layer comprising Ni and/or Cr,
wherein the coating includes only one layer based on Ag, and wherein the IG window unit has a SHGC of no greater 0.55, a visible transmission of at least about 68%, transmissive a* color of from −5.5 to 0.0, transmissive b* color of from +0.5 to +3.5, glass side reflective a* color of from −4.0 to +2.0, and glass side reflective b* color of from −4.0 to +3.0.

2. The IG window unit of claim 1, wherein the first dielectric layer comprising silicon nitride is characterized by $Si_xN_y$, and is Si-rich so that x/y is from 0.76 to 2.0.

3. The IG window unit of claim 1, wherein the first dielectric layer comprising silicon nitride has an index of refraction "n" of from 2.15 to 2.6 and an extinction coefficient "k" less than or equal to 0.07.

4. The IG window unit of claim 1, wherein the first dielectric layer comprising g silicon nitride has an index of refraction "n" of from 2.2 to 2.5 and an extinction coefficient "k" less than or equal to 0.06.

5. The IG window unit of claim 1, wherein the IG unit has a $T_{UV}$ of no greater than 0.29, and a sheet resistance of no greater than 8 ohms/square.

6. The IG window unit of claim 1, wherein the IG unit has a $T_{UV}$ of no greater than 0.27, and a sheet resistance of no greater than 6 ohms/square.

7. The IG window unit of claim 1, wherein the upper contact layer comprises NiCr.

8. The IG window unit of claim 1, wherein the IG window unit has a SHGC of no greater 0.52, and a visible transmission of from about 68-72%.

9. The IG window unit of claim 1, wherein the first dielectric layer comprising silicon nitride is in direct contact with the first glass substrate.

10. The IG window unit of claim 1, wherein the first dielectric layer comprising silicon nitride is from 250 to 600 Å thick, and the lower contact layer comprising zinc oxide is from 50 to 200 Å thick.

11. The IG window unit of claim 1, wherein the IG unit has transmissive a* color of from −5 to −2, transmissive b* color of from +0.5 to +2.5, glass side reflective a* color of from −2.0 to −0.5, and glass side reflective b* color of from −3.0 to −0.5.

12. The IG window unit of claim 1, wherein the lower contact layer comprising zinc oxide is doped with aluminum, and is from about 50-200 Å thick, and wherein the layer comprising silver is from about 120-175 Å thick.

13. An insulating glass (IG) window unit comprising: first and second glass substrates spaced apart from one another so that a space is provided therebetween, at least the first glass substrate supporting a coating and being thermally tempered, wherein the coating consists essentially of:
a first dielectric layer comprising silicon nitride,
a lower contact layer comprising zinc oxide over and contacting the first dielectric layer comprising silicon nitride,
a layer comprising Ag over and contacting the lower contact layer,
an upper contact layer comprising Ni and/or Cr, wherein the layer comprising Ag is located between and directly contacts each of said upper and lower contact layers, and
a second dielectric layer comprising silicon nitride over and contacting the upper contact layer comprising Ni and/or Cr,
wherein the coating includes only one layer based on Ag, and wherein the IG window unit after heat treatment has a SHGC of no greater 0.55, glass side reflective a* color of from −3.0 to +1.0, glass side reflective b* color of from −3.0 to +1.5.

* * * * *